United States Patent
Izumi et al.

(10) Patent No.: US 6,526,568 B1
(45) Date of Patent: Feb. 25, 2003

(54) METHOD FOR GENERATING TEST DATA FOR LISTING PROGRAM, LISTING PROGRAM GENERATION APPARATUS, AND STORAGE MEDIUM STORING PROGRAM FOR GENERATING TEST DATA

(75) Inventors: Masaki Izumi, Tokyo (JP); Motoyuki Ohsugi, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/447,657

(22) Filed: Nov. 23, 1999

(30) Foreign Application Priority Data

Jan. 28, 1999 (JP) .......................................... 11-020433

(51) Int. Cl.[7] .............................................. G06F 9/45
(52) U.S. Cl. ...................... 717/124; 717/127; 717/128
(58) Field of Search ................................. 717/124, 127, 717/128, 131, 116, 122; 702/119; 714/799

(56) References Cited

U.S. PATENT DOCUMENTS

| | | | | |
|---|---|---|---|---|
| 5,175,856 A | * | 12/1992 | Van Dyke et al. | 717/151 |
| 5,408,650 A | * | 4/1995 | Arsenault | 717/124 |
| 5,432,795 A | * | 7/1995 | Robinson | 717/125 |
| 5,446,900 A | * | 8/1995 | Kimelman | 717/124 |
| 5,450,586 A | * | 9/1995 | Kuzara et al. | 717/124 |
| 5,713,010 A | * | 1/1998 | Buzbee et al. | 717/124 |
| 5,754,860 A | * | 5/1998 | McKeeman et al. | 717/124 |
| 5,892,947 A | * | 4/1999 | Delong et al. | 717/100 |
| 5,949,999 A | * | 9/1999 | Song et al. | 717/127 |
| 6,002,869 A | * | 12/1999 | Hinckley | 717/124 |
| 6,112,020 A | * | 8/2000 | Wright | 716/17 |
| 6,178,547 B1 | * | 1/2001 | Pennello | 717/124 |
| 6,182,243 B1 | * | 1/2001 | Berthe et al. | 714/38 |
| 6,269,478 B1 | * | 7/2001 | Lautenbach-Iampe et al. | 717/127 |
| 6,301,701 B1 | * | 10/2001 | Walker et al. | 717/125 |
| 6,321,373 B1 | * | 11/2001 | Ekanadham et al. | 717/119 |
| 6,370,684 B1 | * | 4/2002 | De Pauw et al. | 717/124 |
| 6,434,741 B1 | * | 8/2002 | Mirani et al. | 717/124 |

FOREIGN PATENT DOCUMENTS

| | | |
|---|---|---|
| JP | 7-36737 | 2/1995 |
| JP | 7-262286 | 10/1995 |

OTHER PUBLICATIONS

Geller, "Test data as an aid in proving program correctness", ACM vol. 21, No. 5, pp. 368–375, May 1978.*
Korel, "Automated test data generation for program with procedures", ACM ISSTA, pp. 209–215, 1996.*
Gupta et al, "Automated test data generation using an iterative relaxation method", ACM SIGSOFT, pp. 231–244, Nov. 1998.*
Will, "ACL: A language specific for auditors", ACM, vol. 26, No. 5, pp. 356–361, May 1983.*

* cited by examiner

*Primary Examiner*—Anil Khatri
(74) *Attorney, Agent, or Firm*—Staas & Halsey LLP

(57) ABSTRACT

Test data for each item and listing item information defining an item of a listing are generated. In addition, link table information defining a link between items is generated. Then, an item of test data for use in verifying an output of a listing is defined according to the listing item information, test data for each item, and the link table information. The test data of each item is read from a test data table, combined with each other to generate test data, and stored in a work table. Using the test data stored in the work table, an output of a listing can be verified.

10 Claims, 19 Drawing Sheets

(1)

|  | | | PAGE |
|---|---|---|---|
| ORDER RECEIPT SLIP | | | |
| ORDER RECEIPT NUMBER: _____ | | | |
| TRANSACTION TYPE: _____ | | | |
| CUSTOMER CODE: _____ | | | |
| DELIVERY DATE | ARTICLE | QUANTITY | AMOUNT |
|  |  |  |  |
|  |  |  |  |
|  |  |  |  |
|  |  |  |  |
|  |  |  |  |
|  |  |  |  |

FIG. 2B (3)

REPORT ITEM DEFINITION TABLE

| REPORT ID | ITEM ID | ITEM NAME | LEVEL | DATA TYPE | NUMBER OF DIGITS | FORMAT | NUMBER OF OCCURRENCES | Where CONDITION |
|---|---|---|---|---|---|---|---|---|
| JYU010AR | JYUNO | ORDER RECEIPT NUMBER | CARD | TEXT | 8 | | | ○○ |
| JYU010AR | JYUDATE | TRANSACTION TYPE | CARD | TEXT | 6 | | | |
| JYU010AR | TORICD | CUSTOMER CODE | CARD | TEXT | 6 | | | |
| JYU010AR | NONYDATE | DELIVERY DATE | DETAIL 1 | DATE | | yyy/mm/dd | | |
| JYU010AR | HINMOKU | ARTICLE | DETAIL 1 | TEXT | 30 | | | |
| JYU010AR | KOSUU | QUANTITY | DETAIL 1 | VALUE | 3 | | 3 | |
| JYU010AR | MEIKIN | AMOUNT | DETAIL 1 | VALUE | 11 | ¥#,##0 | | |

22

F I G. 2 D

ORDER RECEIPT SLIP CARD (7)

| ORDER RECEIPT NUMBER | TRANSACTION TYPE | CUSTOMER CODE |
|---|---|---|
| 11000010 | XXXXX | XXXXX |
| 11000020 | XXXXX | XXXXX |
|  |  |  |

ORDER RECEIPT SLIP DETAIL 1 (8)

| ORDER RECEIPT NUMBER | TRANSACTION CODE | DELIVERY DATE | ARTICLE | QUANTITY | AMOUNT |
|---|---|---|---|---|---|
| 11000010 | XXXXX | 1998/06/01 | SPECIFIC PAPER A4 | 5 | 1000 |
| 11000010 | XXXXX | 1998/06/01 | SPECIFIC PAPER A4 | 5 | 1000 |
| 11000010 | XXXXX | 1998/06/01 | SPECIFIC PAPER A4 | 5 | 1000 |
| 11000010 | XXXXX | 1998/06/01 | INK CARTRIDGE | 5 | 1000 |
| 11000010 | XXXXX | 1998/06/01 | INK CARTRIDGE | 5 | 1000 |
| 11000010 | XXXXX | 1998/06/01 | INK CARTRIDGE | 5 | 1000 |
| 11000010 | XXXXX | 1998/06/01 | FLOPPY 3.5 | 5 | 1000 |
| 11000010 | XXXXX | 1998/06/01 | FLOPPY 3.5 | 5 | 1000 |
| 11000010 | XXXXX | 1998/06/01 | FLOPPY 3.5 | 5 | 1000 |
| 11000010 | XXXXX | 1998/07/01 | SPECIFIC PAPER A4 | 5 | 1000 |
| 11000010 | XXXXX | 1998/07/01 | SPECIFIC PAPER A4 | 5 | 1000 |
| 11000010 | XXXXX | 1998/07/01 | SPECIFIC PAPER A4 | 5 | 1000 |
| 11000010 | XXXXX | 1998/07/01 | INK CARTRIDGE | 5 | 1000 |
| 11000010 | XXXXX | 1998/07/01 | INK CARTRIDGE | 5 | 1000 |
| 11000010 | XXXXX | 1998/07/01 | INK CARTRIDGE | 5 | 1000 |
| 11000010 | XXXXX | 1998/07/01 | FLOPPY 3.5 | 5 | 1000 |
| 11000010 | XXXXX | 1998/07/01 | FLOPPY 3.5 | 5 | 1000 |
| 11000010 | XXXXX | 1998/07/01 | FLOPPY 3.5 | 5 | 1000 |
| 11000020 | XXXXX | 1998/06/01 | SPECIFIC PAPER A4 | 5 | 1000 |
| 11000020 | XXXXX | 1998/06/01 | SPECIFIC PAPER A4 | 5 | 1000 |
| 11000020 | XXXXX | 1998/06/01 | SPECIFIC PAPER A4 | 5 | 1000 |
| 11000020 | XXXXX | 1998/06/01 | INK CARTRIDGE | 5 | 1000 |
| 11000020 | XXXXX | 1998/06/01 | INK CARTRIDGE | 5 | 1000 |
| 11000020 | XXXXX | 1998/06/01 | INK CARTRIDGE | 5 | 1000 |
| 11000020 | XXXXX | 1998/06/01 | FLOPPY 3.5 | 5 | 1000 |
| 11000020 | XXXXX | 1998/06/01 | FLOPPY 3.5 | 5 | 1000 |
| 11000020 | XXXXX | 1998/06/01 | FLOPPY 3.5 | 5 | 1000 |
| 11000020 | XXXXX | 1998/07/01 | SPECIFIC PAPER A4 | 5 | 1000 |
| 11000020 | XXXXX | 1998/07/01 | SPECIFIC PAPER A4 | 5 | 1000 |
| 11000020 | XXXXX | 1998/07/01 | SPECIFIC PAPER A4 | 5 | 1000 |
| 11000020 | XXXXX | 1998/07/01 | INK CARTRIDGE | 5 | 1000 |
| 11000020 | XXXXX | 1998/07/01 | INK CARTRIDGE | 5 | 1000 |
| 11000020 | XXXXX | 1998/07/01 | INK CARTRIDGE | 5 | 1000 |
| 11000020 | XXXXX | 1998/07/01 | FLOPPY 3.5 | 5 | 1000 |
| 11000020 | XXXXX | 1998/07/01 | FLOPPY 3.5 | 5 | 1000 |
| 11000020 | XXXXX | 1998/07/01 | FLOPPY 3.5 | 5 | 1000 |

| ORDER RECEIPT SLIP | | | 2/2 |
|---|---|---|---|

ORDER RECEIPT NUMBER: 11000020

| ORDER RECEIPT SLIP | | | 1/2 |
|---|---|---|---|

ORDER RECEIPT NUMBER: 11000010
TRANSACTION TYPE: XXXXX
CUSTOMER CODE: XXXXX

| DELIVERY DATE | ARTICLE | QUANTITY | AMOUNT |
|---|---|---|---|
| 1998/06/01 | SPECIFIC PAPER A4 | 5 | ¥1,000 |
| | | 5 | ¥1,000 |
| | | 5 | ¥1,000 |
| | ARTICLE SUBTOTAL | 15 | ¥3,000 |
| | INK CARTRIDGE | 5 | ¥1,000 |
| | | 5 | ¥1,000 |
| | | 5 | ¥1,000 |
| | ARTICLE SUBTOTAL | 15 | ¥3,000 |
| | FLOPPY 3.5 | 5 | ¥1,000 |
| | | 5 | ¥1,000 |
| | | 5 | ¥1,000 |
| | ARTICLE SUBTOTAL | 15 | ¥3,000 |
| | DAILY SUBTOTAL | 45 | ¥9,000 |
| 1998/07/01 | | 5 | ¥1,000 |
| ...... | ........ | ... | ...... |

FIG. 2H (9)

Insert Into ORDER RECEIPT SLIP CARD Select
ORDER RECEIPT NUMBER, TRANSACTION TYPE,
CUSTOMER CODE From ORDER RECEIPT TABLE Where
ORDER RECEIPT NUMBER = Para1
And    TRANSACTION TYPE = Para2

Insert Into ORDER RECEIPT SLIP DETAIL 1
Select DELIVERY DATE, ······
From ORDER RECEIPT DETAIL TABLE Where
············
·················

FIG. 2J

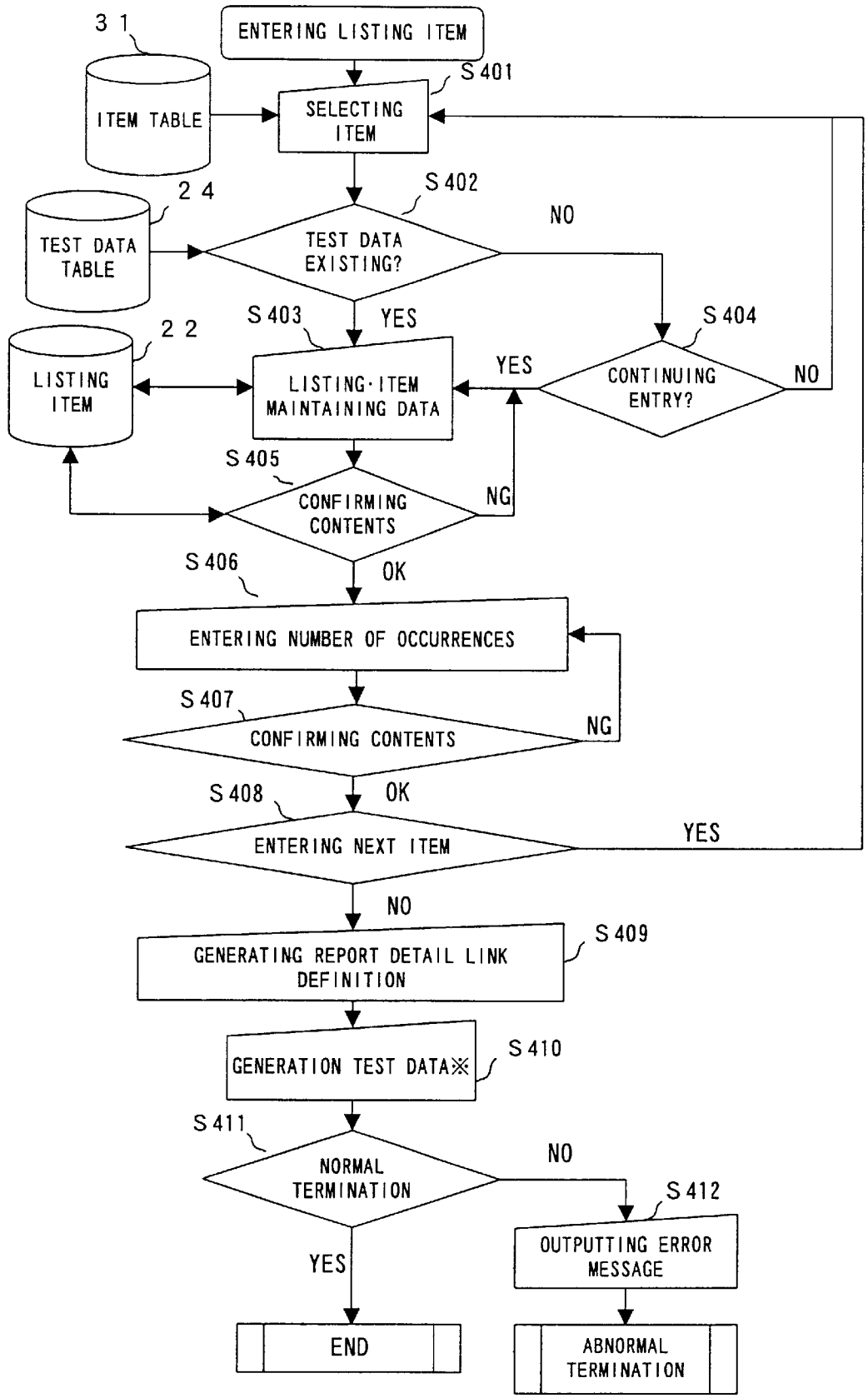
F I G. 4

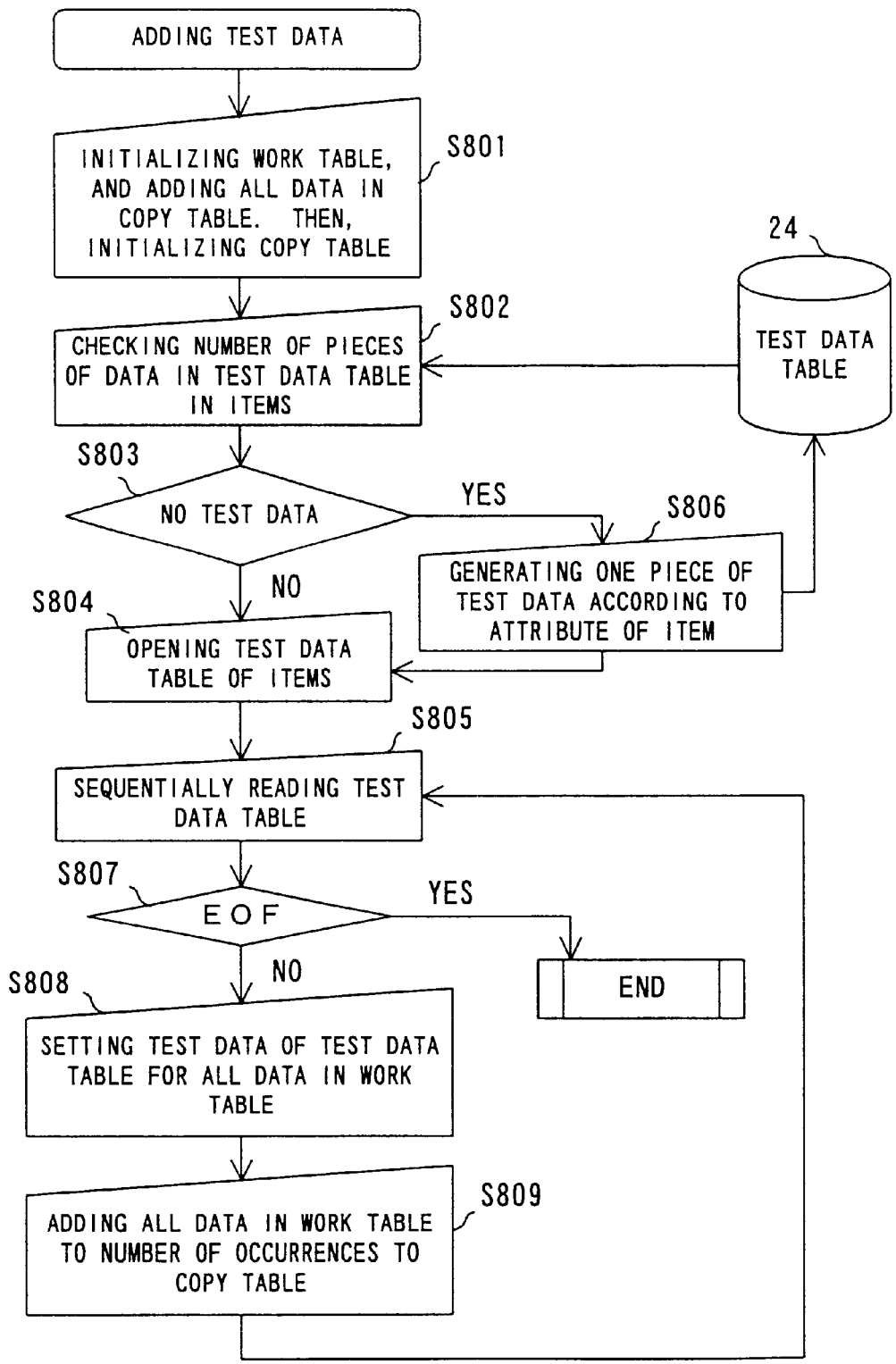
F I G. 8

METHOD FOR GENERATING TEST DATA FOR LISTING PROGRAM, LISTING PROGRAM GENERATION APPARATUS, AND STORAGE MEDIUM STORING PROGRAM FOR GENERATING TEST DATA

BACKGROUND OF THE INVENTION

1. Field of the Invention

The present invention relates to a method for generating test data for a listing program, a listing program generation apparatus, and a storage medium storing a program for generating test data for a listing program.

2. Description of the Related Art

The procedure of generating a listing program for outputting a listing, etc. is:

(1) setting an output item;
(2) determining the design of a report (listing);
(3) generating test data for confirming an output result of a report
(4) verifying each function using test data
(5) generating an extracting logic of actual data Layout images can be different between the state of the design of a report and the state of the actual input of test data. Therefore, to obtain a well-designed report, it is necessary to determine the final design while determining the design of the above described items (1) through (4), generating test data, and repeating the verification of functions.

SUMMARY OF THE INVENTION

If the amount of data in a detail unit about items, numbers, etc. in a listing becomes larger than a predetermined value when a listing is printed, it is necessary to generate test data consistent among a plurality of tables generated in a system, and capable of being verified under various conditions to verify the function of automatically feeding a page, the function of aggregating data in item units, or an output result of a related listing, for example, to verify the consistency, etc. of an output of each listing when an aggregation result of specific items in a listing and an aggregation result of other items of another listing are collectively output to a further listing. In such a case, the time taken in generating test data has occupied a large share in the total time required to develop a listing program.

The present invention aims at easily generating test data with which the function of a listing realized by a listing program, and an output result of a plurality of listings can be verified with consistency.

The present invention generates test data for each item of a listing, generates listing item information for defining an item of a target listing, and test data for use in verifying an output of a listing after combining the test data of different items defined according to the listing item information.

Since test data for use in verifying an output of each item in a listing can be easily generated based on the test data for each item and the listing item information according to the present invention, the load of generating test data when a listing program is prepared can be reduced. In addition, since various patterns of test data can be automatically generated by, for example, setting the number of occurrences of the test data, the test data for use in verifying the function of feeding a page in a listing, aggregating data for each item, etc. can be easily generated. Furthermore, since test data consistent among a plurality of listings can be used, a plurality of related listings can be verified under the same condition.

BRIEF DESCRIPTION OF THE DRAWINGS

FIG. 2B shows an order receipt slip;

FIG. 2D shows a report item definition table 22;

FIG. 2G shows an order receipt slip detail and an order receipt slip card;

FIG. 2H shows an order receipt slip 20;

FIG. 2I shows a applicable table definition table 25;

FIG. 2J shows a table extraction batch program;

FIG. 4 is a flowchart of entering listing items.

FIG. 8 is a flowchart of adding test data;

DESCRIPTION OF THE PREFERRED EMBODIMENTS

Figure 1:
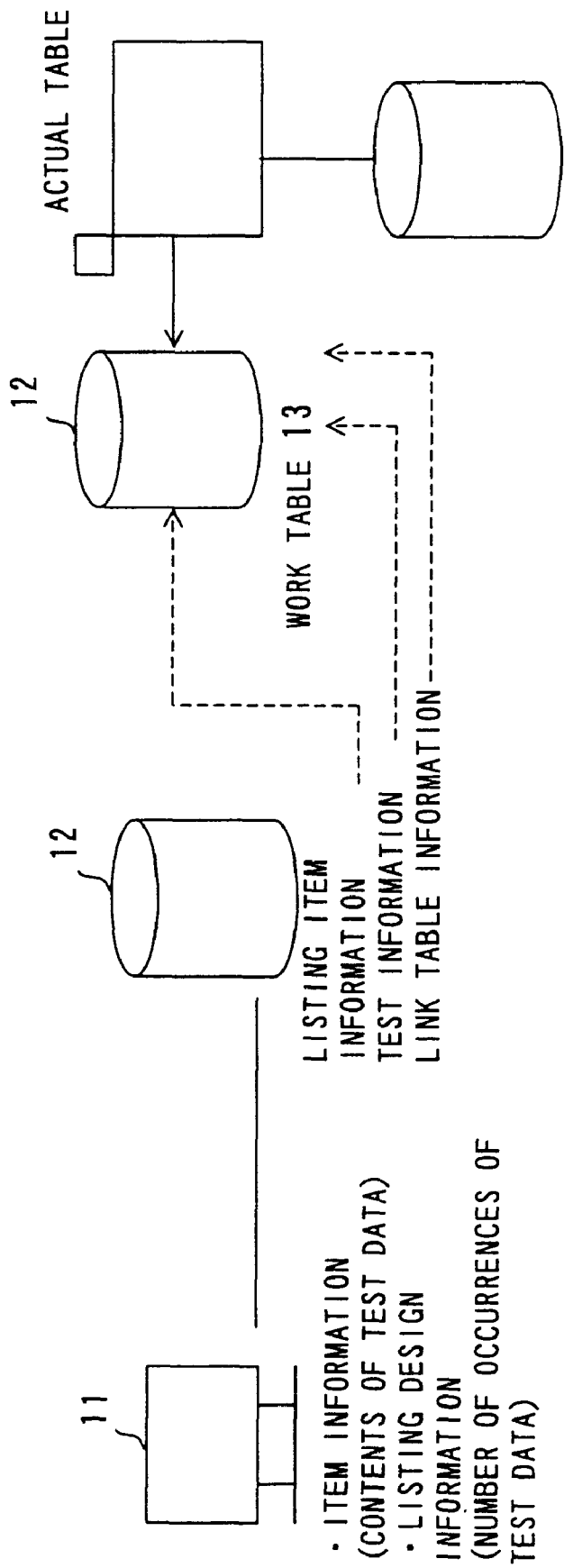
FIG. 1 shows information and a table used in a listing program generation apparatus.

The embodiments of the present invention are described below by referring to the attached drawings. FIG. 1 shows the information and the table used in a listing program generation apparatus (comprising a personal computer, etc.) according to an embodiment of the present invention.

When test data is generated for use in verifying an output result of a listing, item information (test data for each item) and listing design information (item name, the number of occurrences of test data, etc.) are input from the input unit of a listing program generation apparatus 11. The listing program generation apparatus 11 generates listing item information (corresponding to a report item definition table 22 shown in FIGS. 2A and 2D) in which listing items and the number of occurrences of test data are defined according to the above described information, test information for each item (corresponding to a test data table 24 shown in FIGS. 2A and 2F), and link table information (corresponding to a report detail link definition table 23 shown in FIGS. 2A and 2E), and stores the information in a storage unit 12.

In addition, the storage unit 12 in the listing program generation apparatus 11 further stores the information about each item, for example, an item ID, an item name (order receipt number, transaction type, customer code, delivery date, etc.), level information discriminating the data in a card unit printed at an upper portion of a listing from the data in the details unit, the data type of an item, a number of digits, etc. Then, test data is generated to the number of occurrences of the test data according to the listing item information, the test information, and the link table information. Then, the test data obtained by combining the test data for each item is set in a work table 13. An output result of a listing is verified using the test data of the work table 13.

Figure 2A:
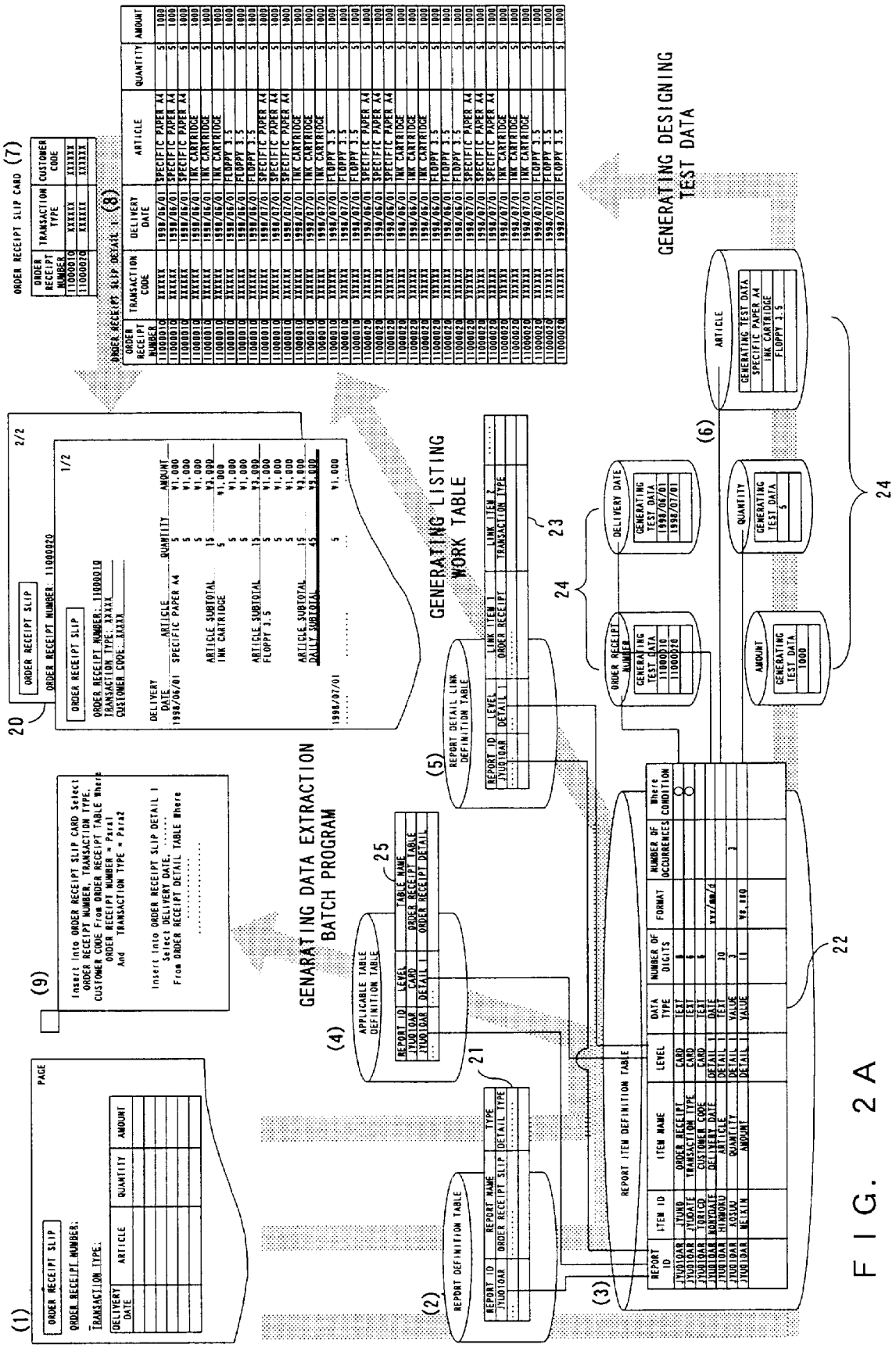
FIG. 2A shows the function of supporting the generation of a listing program.

FIG. 2A shows the function of supporting the generation of a listing program by the listing program generation apparatus 11. FIG. 2A actually shows an example of the case in which two order receipt slips 20 shown on the right in FIG. 2 are prepared based on the order receipt slip (1). FIGS. 2B through 2J show a report definition table 21 shown in FIG. 2A, a report item definition table 22, a test data table 24, etc.

Figure 2C:
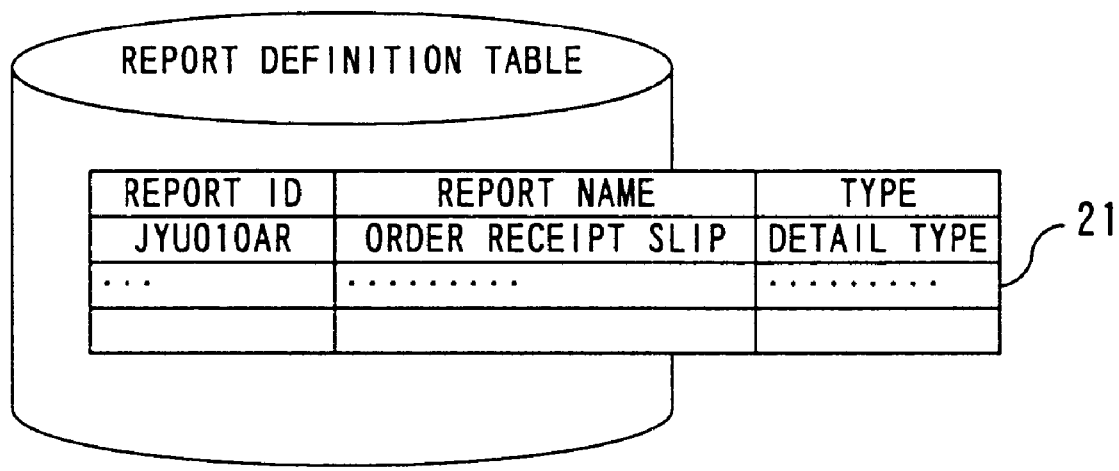
FIG. 2C shows a report definition table 21.

First, the report name and the report ID of an order receipt slip are set in the report definition table 21 shown in FIGS. 2A and 2C ((2) shown in FIG. 2A). Then, each item of the order receipt slip is set in the report item definition table 22 ((3) shown in FIG. 2A). In this report item definition table 22, an item ID, an item name (an order receipt number, a transaction type, a customer code, a delivery date, etc.), a level indicating whether an item refers to the data of a card unit printed at an upper portion of a listing, or the data of a detail unit, a data type of an item, the number of digits, a format, the number of occurrences of test data, etc. are set as shown in FIGS. 2A and 2D.

Next, the report detail link definition table 23 (shown in FIG. 2E) which defines the link between the items 'order receipt number', 'transaction type', and 'transaction code' and the items of the detail unit is generated according to the level information about the 'card' and the 'detail 1' of the report item definition table 22 ((5) shown in FIG. 2A).

Then, according to the report item definition table 22, the report detail link definition table 23, etc., the work table 13 storing test data is generated. Then, the test data of each item of the work table 13 is read from the corresponding test data table 24 (shown in FIG. 2F), and the read test data of each item is combined with each other and set in the work table 13. At this time, test data is repeatedly generated to the set number of occurrences for an item whose number of occurrences is set in the report item definition table 22.

Since the number of occurrences of 3 is set for the item of 'quantity' in the report item definition table 22 shown in FIGS. 2A and 2D, three pieces of test data each having the quantity of '5' are generated for the test data of the order receipt number, the delivery date, and the article. As a result, three pieces of the same data are generated for each of the order receipt number, the delivery date, and the article for the test data stored in the work table 13 are generated. The contents are shown by the order receipt slip detail 1 of (8) shown in FIGS. 2A and 2G.

In addition, according to the report item definition table 22, a card used in the order receipt slip 20 and an applicable table definition table 25 (shown in FIG. 2I) which defines a detail table are generated ((4) shown in FIG. 2A). According to the applicable table definition table 25 and the report item definition table 22, a model of a data extraction batch program shown in FIG. 2J is generated ((9) shown in FIG. 2A).

Next, the process of entering test data for each item in a listing performed by the above described listing program generation apparatus 11 is described below by referring to the flowchart shown in FIG. 3.

Figure 3:
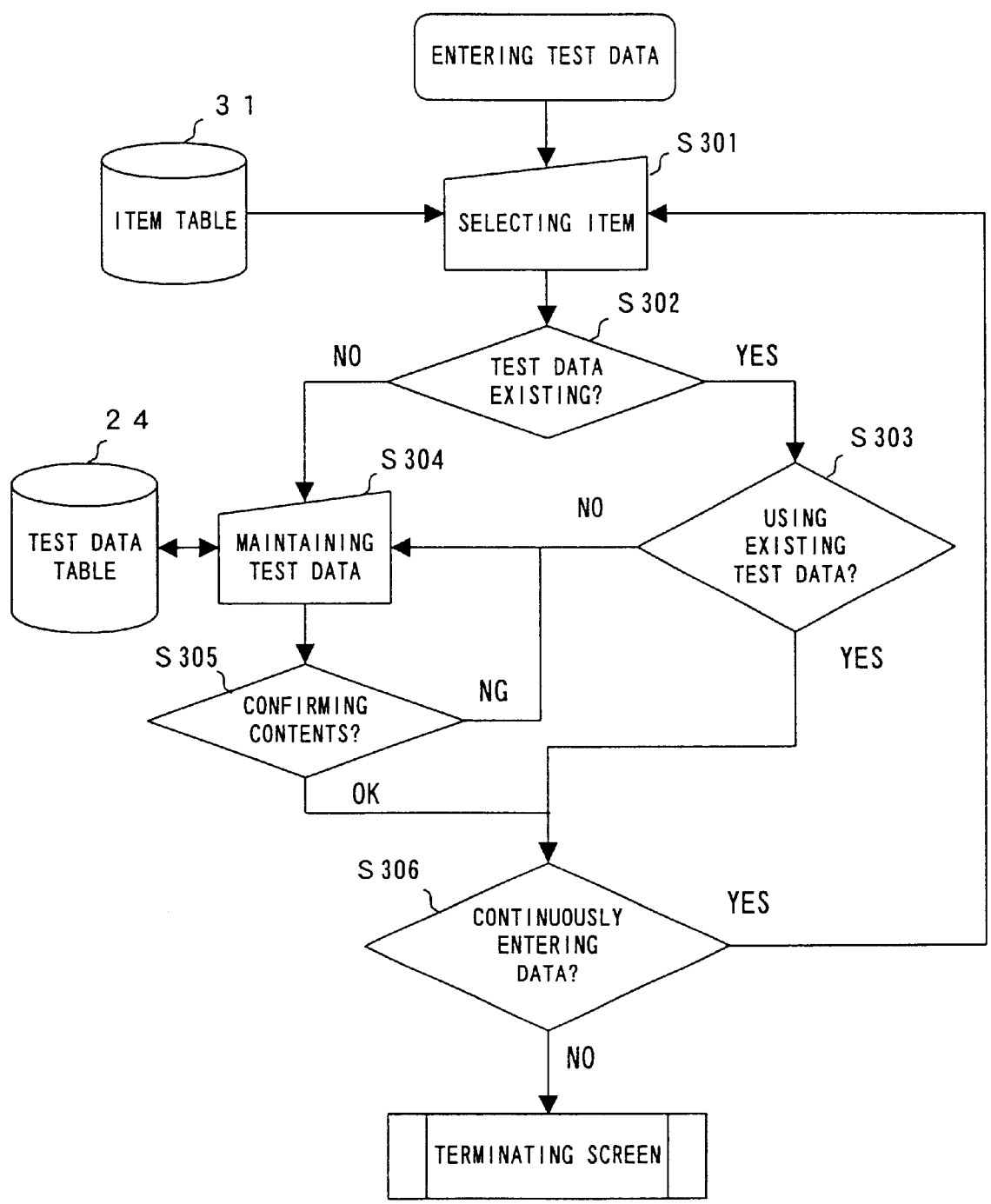
FIG. 3 is a flowchart of a test data entering process.

First, an item for which test data is to be entered is selected from among the items in an item table 31 (S301 shown in FIG. 3). Then, it is determined whether or not there is the test data for the selected item (S302). If the test data has already been generated for the selected item, then control is passed to step S303, and it is determined whether or not the generated test data is to be used.

When existing test data is not used, or when test data is not prepared for a specific item, control is passed to step S304, and the test data is maintained, that is, the test data is generated. The generated test data is entered in the test data table 24 shown in FIG. 2F.

If test data has been generated, the contents are confirmed (S305). If the generated test data is not acceptable (NG in S305), then control is passed to step S304, and test data is generated again. If the generated test data is acceptable (OK in S305), then control is passed to step S306, and it is determined whether or not test data is to be continuously entered. If the test data is to be continuously entered, then control is returned to step S301, another item is selected, and the test data is entered.

Figure 2E:
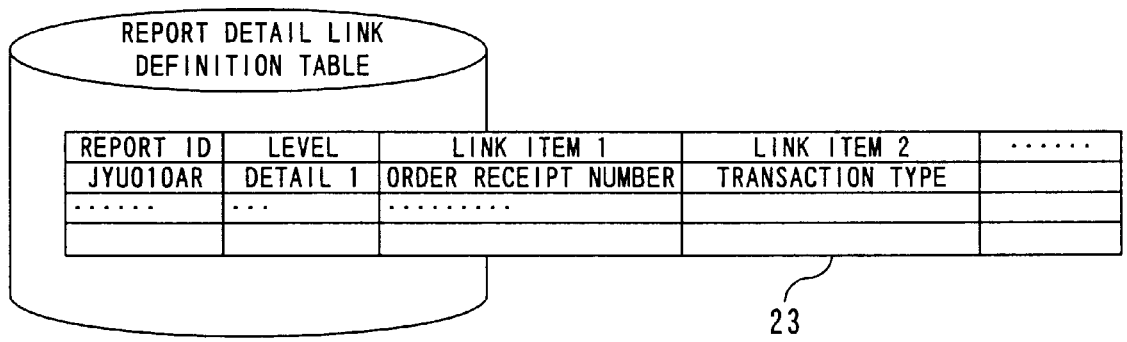
FIG. 2E shows a report detail link definition table 23.
Figure 2F:
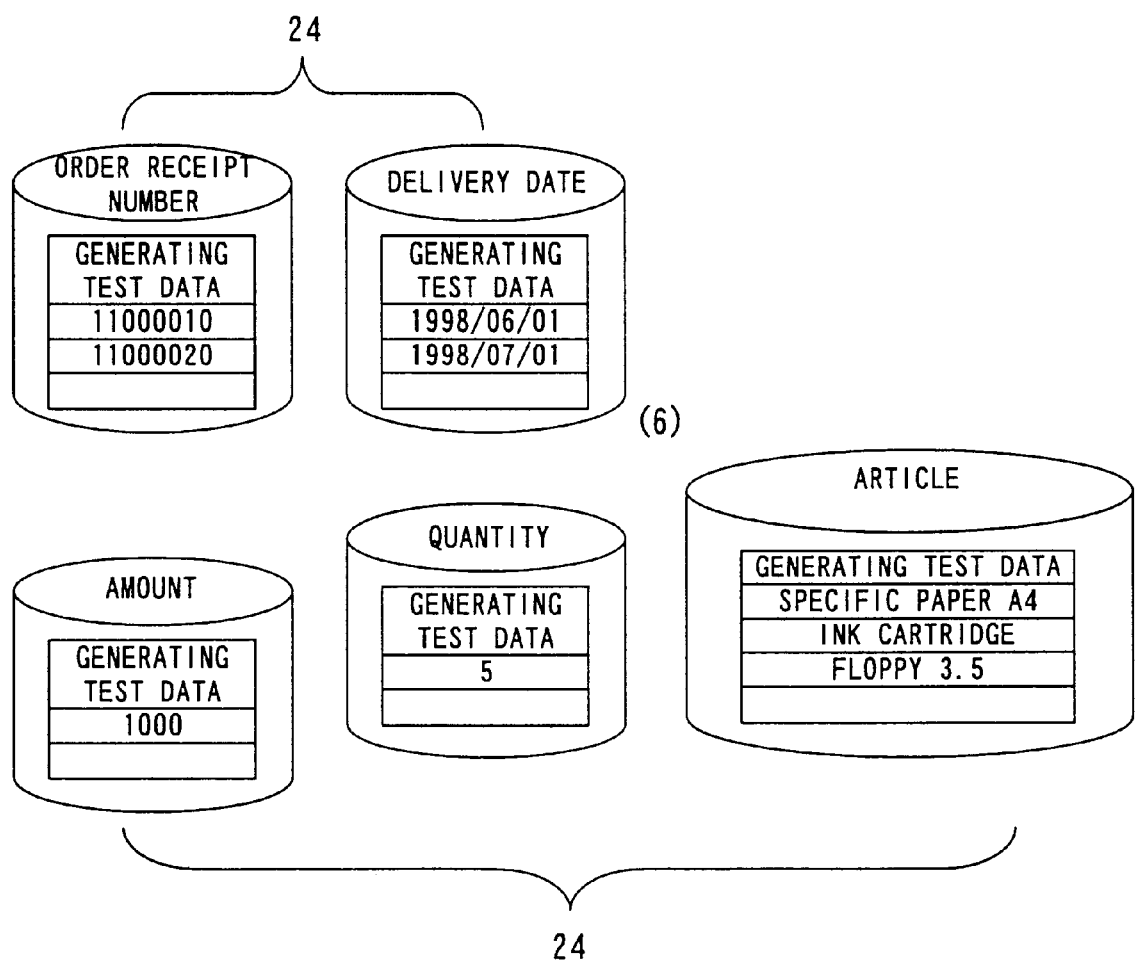
FIG. 2F shows a test data table 24.
Figure 21:
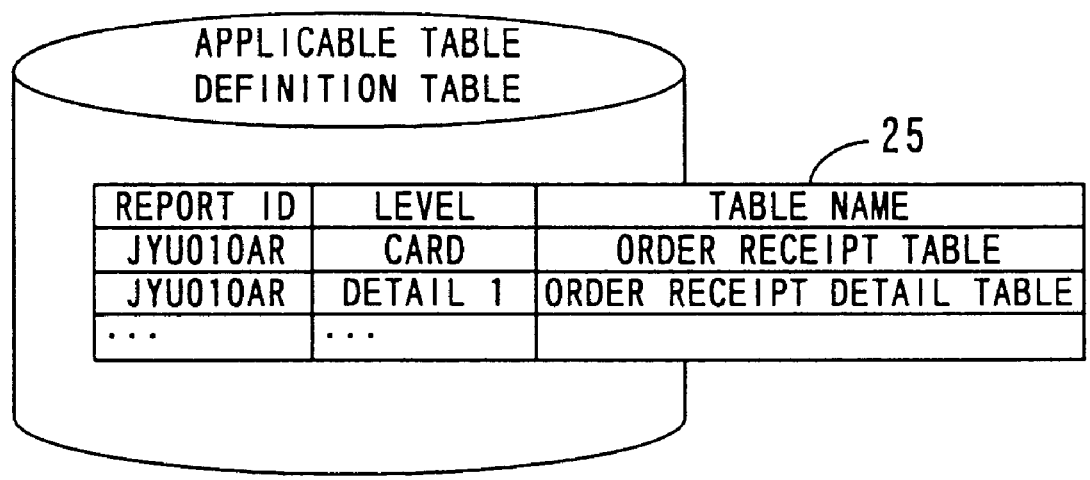

In the above described process, the test data table 24 for each item as shown in FIG. 2F is generated.

Then, the process of entering an item of a listing in the report item definition table 22 is described by referring to the flowchart shown in FIG. 4.

First, an item of a listing for which test data is to be set is selected (S401 shown in FIG. 4). Then, it is determined whether or not test data is set in the test data table 24 of the selected item (S402). If the test data is set, the item ID, the item name, the level, the data type, etc. of the selected item are entered in the report item definition table 22 (S403).

If it is determined in step S402 that no test data is set for the selected item (NO in S402), then control is passed to step S404, and it is confirmed whether or not items are to be continuously entered. If they are to be continuously entered, then control is passed to step S403, and the selected item is entered in the report item definition table 22. If no test data is set for the selected item, and items are not to be continuously entered (NO in S404), then control is returned to step S401, and the next item is selected.

If one item has been entered, then the contents are confirmed (S405). When the contents are acceptable, the number of occurrences of the test data is entered (S406). The number of occurrences refers to the data set when the test data set in the test data table 24 is repeatedly used. Thus, even if the number of pieces of test data in the test data table 24 is small for an item, the same test data is repeatedly generated, and the test data is combined with the test data of another item, thereby generating the test data of various test patterns.

For example, only one piece of data '5' is set as the test data of the item 'quantity' shown in FIG. 2F. However, by setting the number of occurrences of '3' for the item 'quantity', the data '5' is used three times as the test data of the item 'quantity', and the test data is generated by combining the above described three pieces of test data with the test data of another item.

If the number of occurrences of the test data is confirmed and accepted (OK in S407), then it is determined whether or not the next item is to be entered (S408). If there is an item to be entered in the report item definition table 22, then control is returned to step S401, the next item is selected, and the above described processes are repeated.

When the above described processes are completed, the report item definition table 22 as shown in FIGS. 2A and 2D is generated. In this example, the 'card' is set as a level of the items 'order receipt number', 'transaction type', and 'customer code'. The 'detail 1' is set as the level of the items 'delivery date', 'article', 'quantity', and 'amount'. Although '3' is set as the number of occurrences for the item 'quantity', the test data entered in the test data table 24 of other items is used only once because no numbers of occurrences are set for other items.

When items are completely entered in the report item definition table 22, the report detail link definition table 23 which defines the link between the item having the level 'detail 1' and the item having the level 'card' in the report item definition table 22 (S409). In addition, when an item for which a level other than 'detail 1' exists, a level other than 'detail 1' and the link table of the item of 'card' are generated.

Next, test data is generated (S410), and it is determined whether or not the test data has been normally generated (S411). When the test data has been normally generated, the listing item entering process is terminated. If the test data has not been normally generated, an error message is output (S412), thereby abnormally terminating the process.

Next, the outline of the contents of the test data generating process in step S410 shown in FIG. 4 is described below by referring to the flowchart shown in FIG. 5.

Figure 5:
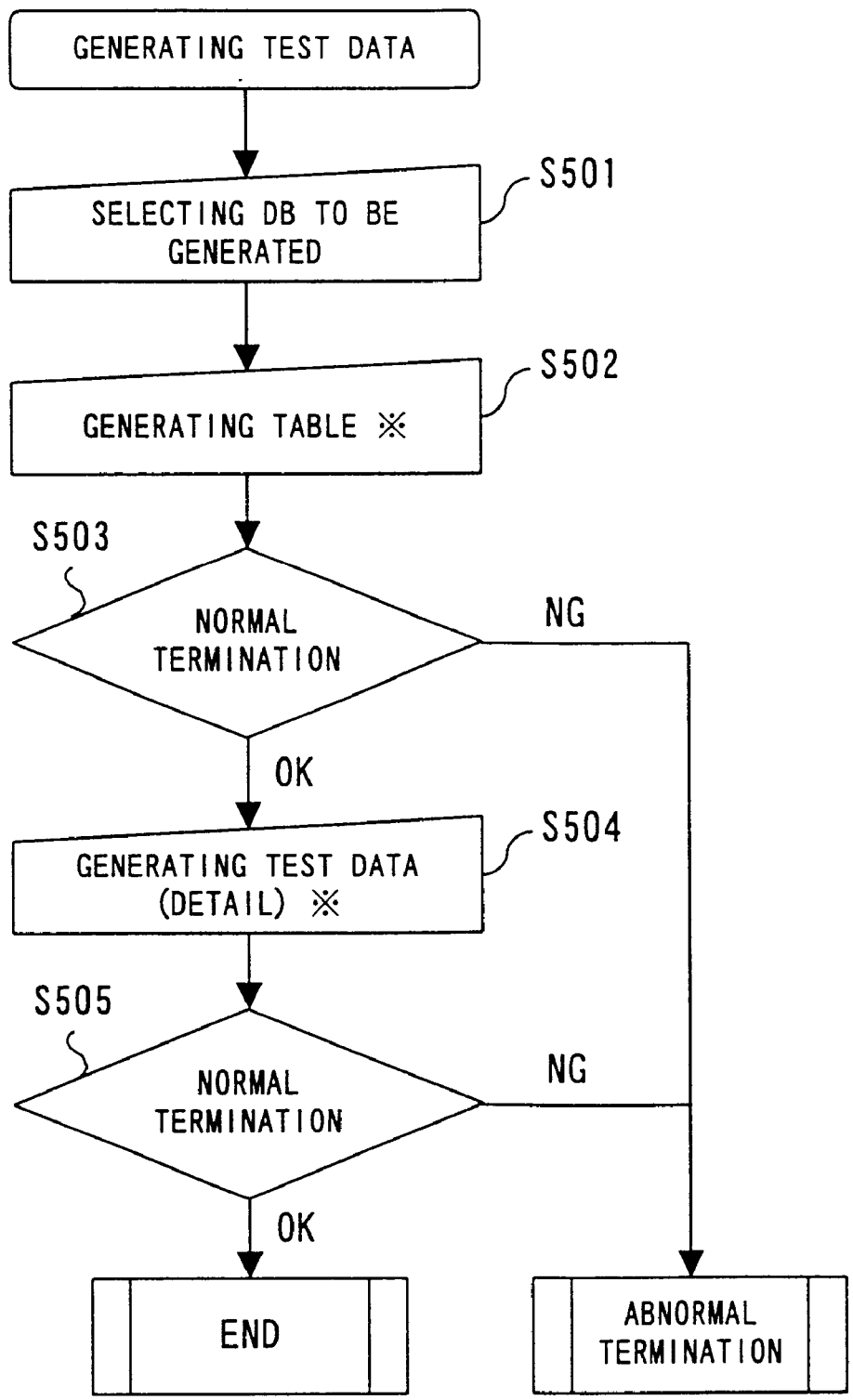
FIG. 5 is a general flowchart of generating test data.

First, the data base storing the test data for use in verifying the output of a listing is selected (S501 shown in FIG. 5). Next, the work table (work data storage unit) 13 storing the test data in the selected database is generated (S502).

The process of generating the work table 13 in step S502 shown in FIG. 5 is described below by referring to the flowchart shown in FIG. 6.

Figure 6:
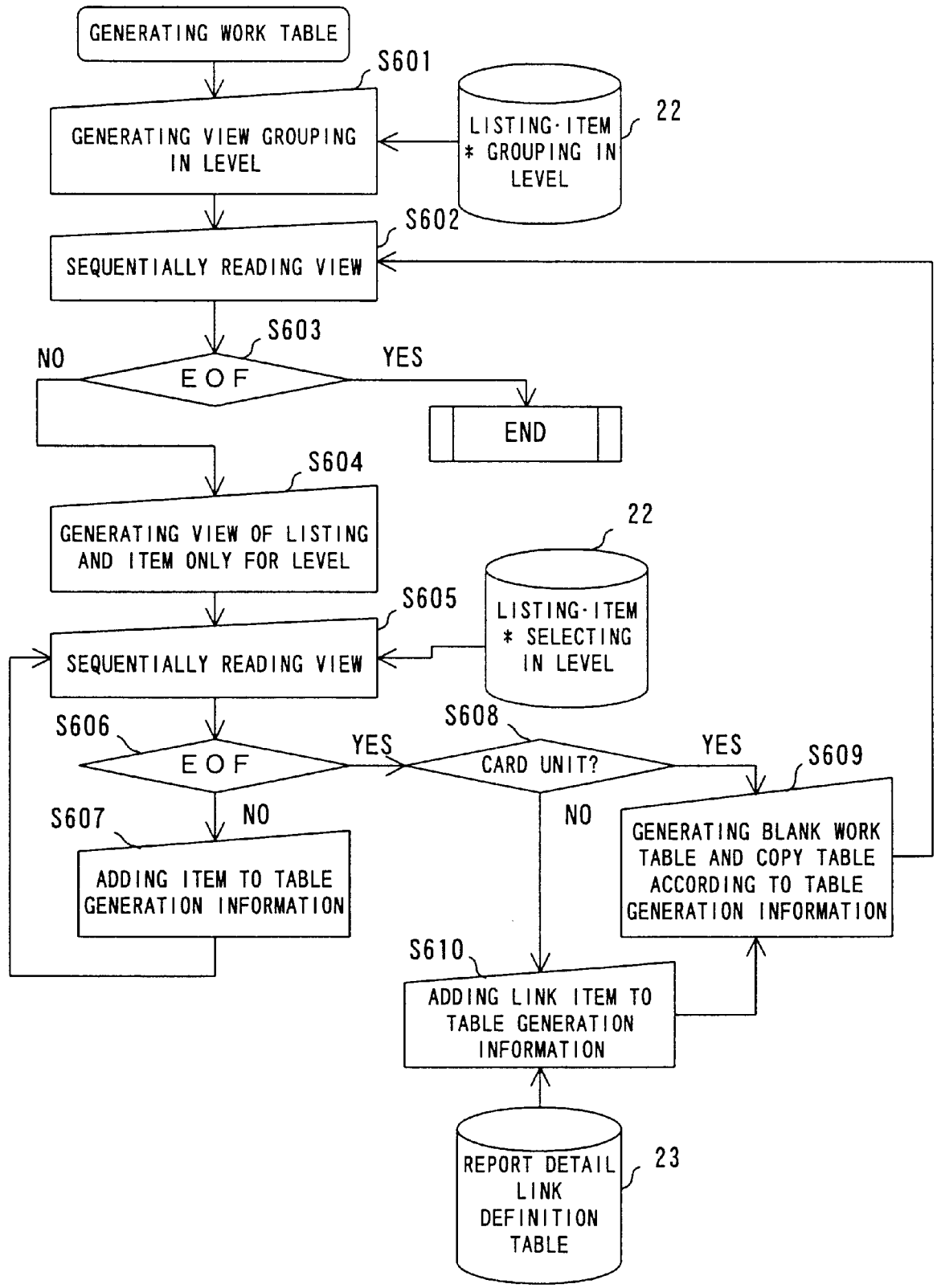
FIG. 6 is a flowchart of generating a work table.

First, the type of the level of the report item definition table 22 is extracted, and views grouped in level units are generated (S601 shown in FIG. 6). A view refers to a table containing data indicating the types of levels extracted from the report item definition table 22, and is temporarily generated in the memory. When two type of levels of 'card' and 'detail 1' are defined as in the report item definition table 22 shown in FIGS. 2A and 2D, a table containing two records of 'card' and 'detail 1' as views in level units is generated in the memory.

Then, the views generated in level units are sequentially read (S602), and it is determined whether or not it is the end of view (EOF), that is, whether or not data is thereafter set for the view in level units (S603). When it is not the end of views in level units, that is, when there is data not yet read in the view, an item at a corresponding level is read from the report item definition table 22 to generate a view in units of items having the same level (S604).

That is, when two types of levels of the 'card' and 'detail 1' are defined as in the report item definition table 22 shown in FIGS. 2A and 2D, a table containing two records of the 'card' and 'detail 1' is first prepared in the memory, and then, the 'card' is read as a level from the table (view). The item whose level is the 'card' is retrieved from the report item definition table 22, and the table containing the three retrieved items 'order receipt number', 'transaction type', and 'customer code' is generated in the memory.

Next, the data of a view in units of items having the same level are sequentially read (S605), and it is determined whether or not it is the end of view (S606). If it is not the end of view, an item read from the view in item units is added to the table generation information for use in generating the work table 13 (S607). If one item read from the view has been added to the table generation information, then control is returned to step S605, and the next item in the view in item units is read. After the above described processes. the items 'order receipt number', 'transaction type', and 'transaction code' whose levels of the report item definition table 22 shown in FIGS. 2A and 2D are 'card' are added as item data of the table generation information. If the table generation information of all items of a level has been completely set, then control is returned to step S602 through the process described later, the next level is read from the view in level units, and the above described processes are repeated. Thus, the items 'delivery date', 'article', 'quantity', and 'amount' having the level 'detail 1' are set as the items of the table generation information.

When it is determined in step S606 that the data is the end of the view in item units (YES in S606), then control is passed to step S608, and it is determined whether or not the level of the view in item units is 'card'. If the level is 'card', then control is passed to step S609, and the work table 13 defining the name of an item whose level is 'card' according to the table generation information, and a copy table having the same contents as the work table 13 are generated. In this process, for example, a work table (order receipt slip card of 7 shown in FIG. 2A) containing the items 'order receipt number', 'transaction type', and 'customer code' is generated. Then, control is returned to step S602, and the next level is read from the view in level units.

If it is determined in step S608 that the level is not 'card' (YES in S608), then the link item of the report detail link definition table 23 defined in step S409 shown in FIG. 4 is added to the table generation information. In this process, for example, the link item 1 'order receipt number' and the link item 2 'transaction type' in the report detail link definition table 23 shown in FIGS. 2A and 2E are added as the link items of 'detail 1' to the table generation information.

Thus, since the table generation information containing a link-to item whose level is 'detail 1' has been generated, control is passed to step S609, and the work table 13 (for example, order receipt slip detail 1 of (8) shown in FIGS. 2A and 2G) containing the item of 'detail 1' of the table generation information and its link-to item, and the copy table having the same contents as the work table 13 are generated.

If the work table 13 storing the test data has been completely generated as described above, then it is determined in step S503 shown in FIG. 5 whether or not the work table 13 has been normally generated. If the work table 13 has been normally generated, then the process of generating the test data in step S504 is performed, and it is determined whether or not the process has been normally terminated (S505). If the test data generating process has been normally completed, then the process terminates as is. If an abnormal condition occurs, then an abnormal termination process is performed.

The process of generating the test data in step S504 shown in FIG. 5 is described below by referring to the flowchart shown in FIG. 7.

Figure 7:
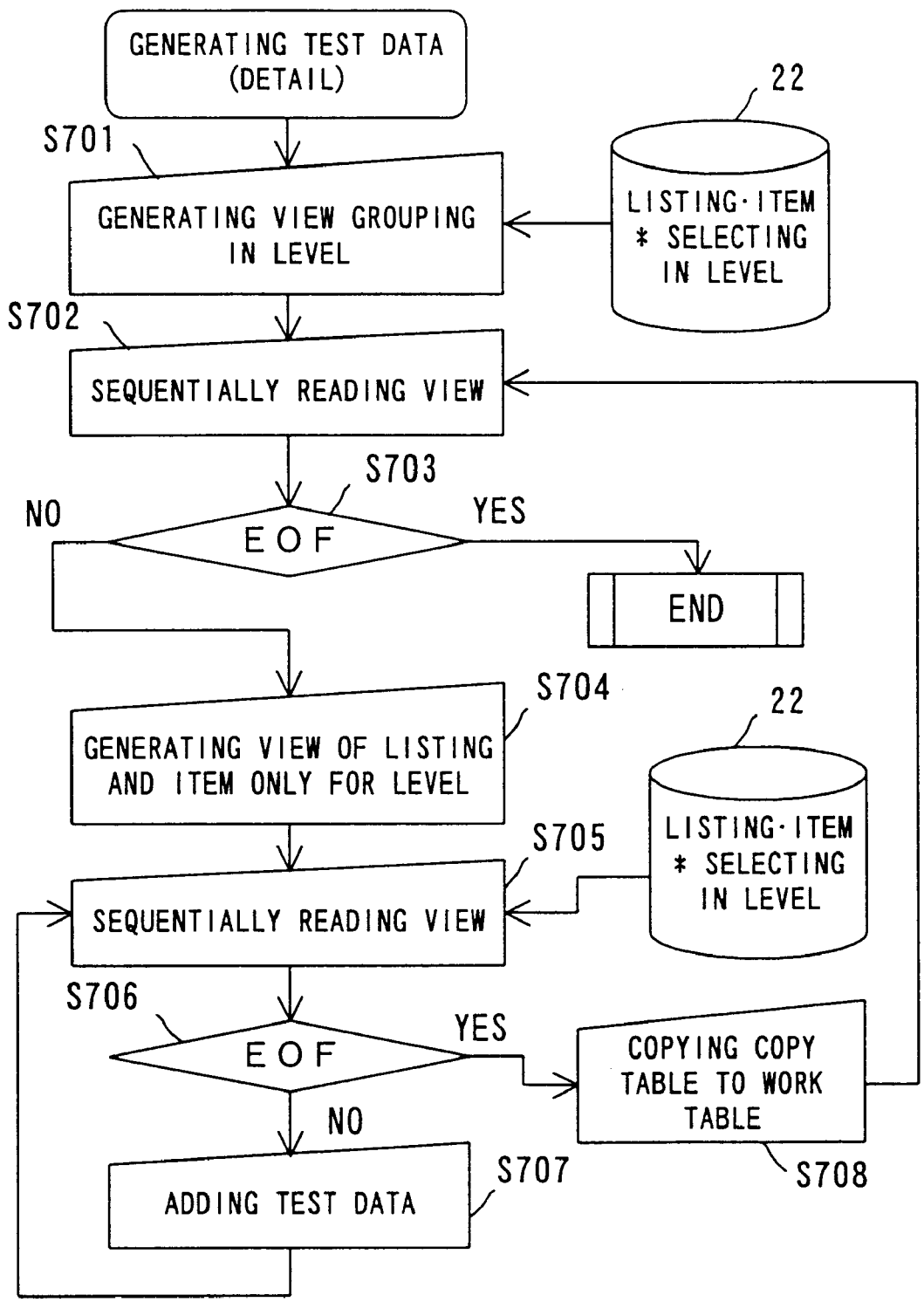
FIG. 7 is a detailed flowchart of generating test data.

As in the above described process of generating the work table 13, the views grouped in level units in the report item definition table 22, that is, a table containing records of respective level types is generated (S701 shown in FIG. 7). Next, the data of the generated view in level units are sequentially read (S702), and it is determined whether or not it is the end of view (EOF) (S703). If it is not the end of view in level units, then control is passed to step S704, an item having the same level as the level read from the view in level units is retrieved from the report item definition table 22, and a view in item units containing the retrieved item as one record is generated (S705). Then, the records of the view in item units are sequentially read (S705), and it is determined whether or not it is the end of view (S706). If it is not the end of view, then the process of adding test data is performed on the read item (S707), and then control is returned to step S705, and the next item in the view in item units is read.

Then, the test data adding process in step S707 shown in FIG. 7 is described below by referring to the flowchart shown in FIG. 8.

First, the data of each item in the generated work table 13 is initialized, all the test data in the copy table is added to the work table 13, and then the copy table is initialized (801 shown in FIG. 8). This process is performed for the following ground. That is, since the test data is added for the times of occurrences to the copy table by the process of setting the test data for each item as described later, the contents of the copy table are stored in the work table 13 when the adding process of the test data of one item is performed and the test data adding process of the next item is started.

Next, the number of pieces of test data of the corresponding item is checked in the test data table 24 (S802). Then, it is determined whether or not the number of pieces of test data is 0 (S803). If the number of pieces of test data is not 0, the test data table 24 of the item is opened (S804), and the test data are sequentially read from the test data table 24 (S805). If it is determined in step S803 that the number of pieces of test data in the corresponding test data table 24 is 0, that is, if no test data is set in the item, then one piece of test data is generated based on the attribute of the item (S806). Namely, if the data type of an item is text, then text data is generated to the set number of digits. If the data type is date, the date data is generated.

Next, it is determined whether or not the end of the test data table 24 has been reached, that is, all test data of the test data table 24 have been read (S807).

If it is determined in step S807 that it is not the end of a test data table 32 (NO in S807), then control is passed to step S808, and the test data of each item is set for all records of the work tables 13. Furthermore, when the number of occurrences of test data is set for the corresponding item in the report item definition table 22, all the test data of the work tables 13 is added to the copy table to the number of occurrences (S809). Thus, test data of each item of the work table 13 is copied to the copy table to the number of occurrences. Then, control is returned to step S805, the next test data is read from the test data table 24, and the above described processes are repeated.

When the test data in the test data table 24 is completely read (YES in S807), the process terminates.

When the test data adding process is completed as described above, control is returned to step S705 shown in FIG. 7, and the next item of the same level in the view in item units is read. Then, it is determined whether or not it is the end of view (EOF) in item units (S706). If it is the end of view in item units (YES in S706), then all test data set in the copy table is copied to the work table 13 (S708). Thus, in the test data adding process (FIG. 8), all test data in the copy table added to the number of occurrences is copied to the work table 13.

Described below is the procedure of setting the test data in the work table 13 according to the report item definition table 22 shown in FIGS. 2A and 2D and the test data table 24 of each item.

First, the level of the report item definition table 22 is extracted, and the report detail link definition table 23 defining the 'order receipt number' and 'transaction type' as the items linked to the level 'detail 1' (item of detail 1) is generated.

Then, based on the generated report detail link definition table 23, and the item whose level is 'detail 1', the 'order receipt number', 'transaction type', 'article', 'quantity', and 'amount' are set as items in the work table 13. Then, the test data of each item set in the work table 13 is read from the test data table 24 and set. At this time, for the item whose number of occurrences is set, the test data of each item and the test data of the item whose number of occurrences is set are copied to the number of occurrences.

Practically set according to the test data table 24 of each item shown in FIGS. 2A and 2F are '110000010' as test data, 'XXXXXX' as a transaction type not shown in the drawings, '1998/06/01' as a delivery date, 'specific paper A4' as an article, '5' as a quantity, and '1000' as an amount. Then, the test data of each item is combined with each other, and set in the work table 13. In addition, in the present embodiment, since '3' is set as the number of occurrences, the data of each record in the work table 13 is copied three times, and set in the copy table. Finally, the contents of the copy table are copied to the work table 13, and the test data for use in verifying the output of the listing is generated in the work table 13.

In the examples shown in FIGS. 2A and 2F, two pieces of test data ate set in 'order receipt number', two in 'delivery date', one in 'amount', three in 'article', and one in 'quantity'. However, since '3' is set as the number of occurrences of 'quantity', the test data for a total of 36 orders are generated as shown in the order receipt slip detail 8 shown in FIGS. 2A and 2G. Thus, by setting the number of occurrences of test data, various combinations of test data can be generated from a small number of pieces of test data. As a result, test data for use in verifying the function of feeding a page of an order receipt slip, aggregating items, etc. can be easily generated.

According to the above described embodiment, test data for use in verifying the output of a listing can be easily generated by generating test data for each item of the listing, and generating the report item definition table 22 in which items of the listing are defined. Therefore, the operations of generating test data for used in verifying the functions of feeding a listing, aggregating data for each items can be reduced, thereby efficiently generating a listing program. In addition, since the output results of various listings can be verified by commonly using the test data set in the test data table 24 in the above described embodiment, related listings can be verified using unified and consistent test data.

Next, the process of generating a program model of a data extracting batch program for extracting actual data of a listing from the report item definition table 22 is described below by referring to the flowchart shown in FIG. 9.

Figure 9:
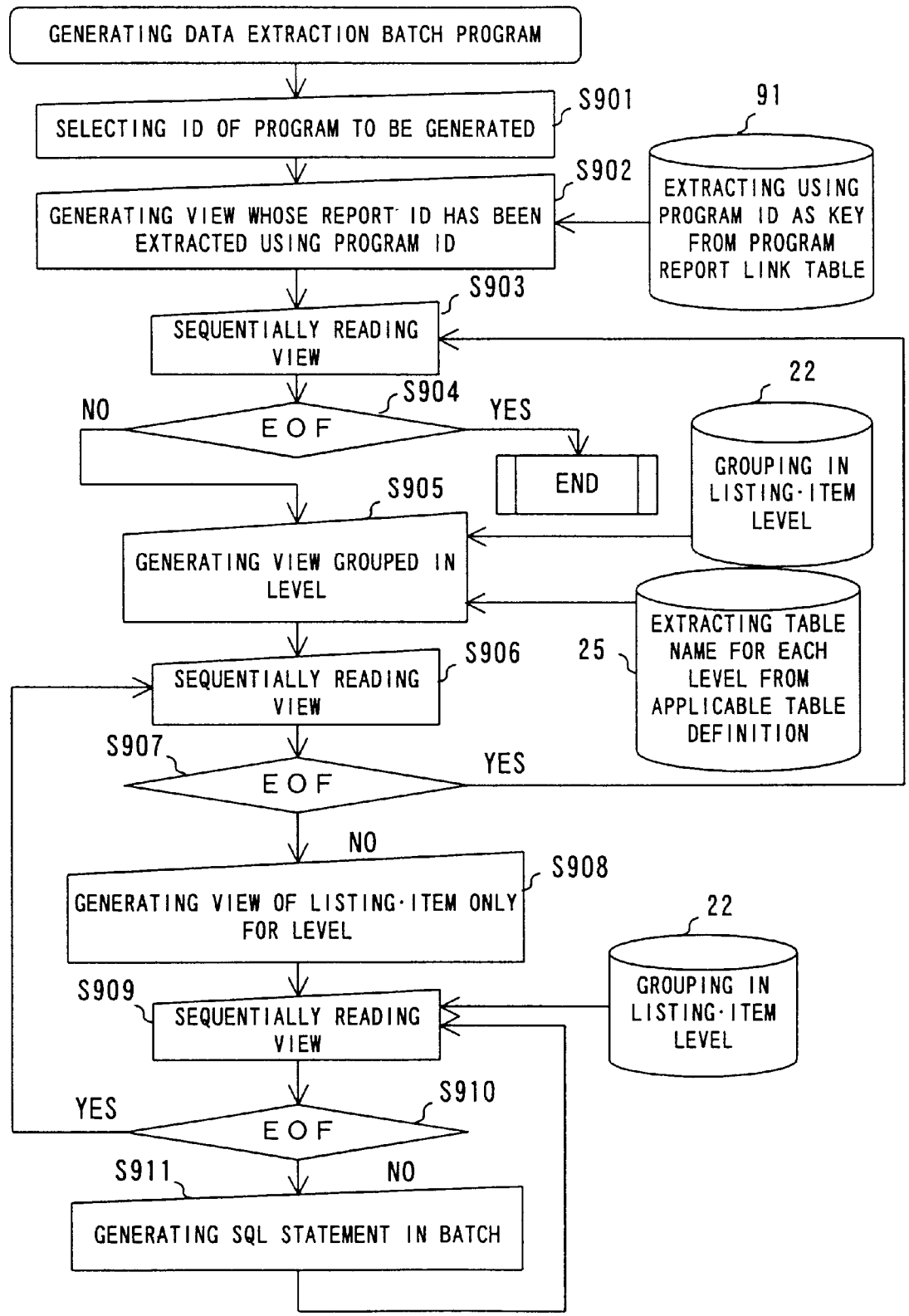
FIG. 9 is a flowchart of generating a data extracting batch program.

A program ID of a program to be generated is selected (S901 shown in FIG. 9). When a program ID is selected, a report ID is extracted using the program ID as a key from a program report link table 91 which associates the program ID with the report ID. Then, a view (a table containing extracted report IDs) containing extracted report IDs is generated (S902). The view in report ID units is temporarily generated in the memory. Then, the data in the view in report ID units are sequentially read (S903), and it is determined whether or not the data at the end of the view (EOF), that is, the last data entered in the view, has been read (S904). If it is the end of the view in report ID units, then the process terminates.

If it is not the end of the view (NO in S904), that is, if data to be read still exists in the view in report ID units, then control is passed to step S905, the type of a level is extracted from the report item definition table 22 of the read report ID, and a view in which data is grouped in level units (a table containing extracted levels) is generated. In addition, a table name is extracted from the applicable table definition table 25.

Then, the data are sequentially read from the view extracted in level units (S906), and it is determined whether or not the end of view (EOF) has been reached (S907). If it is the end of the view in level units (YES in S907), then control is returned to step S903, the next data in the view in report ID units is read, and the above described processes are repeated.

If it is not the end of the view in level units (NO in S907), then control is passed to step S908, and a view in item units (a table containing items of the same level) is generated by extracting items of a corresponding level from the report item definition table 22. Then, the data of the view in item units are sequentially read (S909), and it is determined whether or not it is the end of the view (EOF). If it is not the end of the view in item units, then an SQL (structured query language) statement generating process of a batch program is performed using the read item data (S911). In this process, a table name having the extracted level is retrieved from the applicable table definition table 25, and an SQL statement for extracting actual data of an extracted item (item entered in the report item definition table 22) is generated from the table having the retrieved table name. When an SQL statement generating process is completed on one item, then control is returned to step S909, and the above described process is repeated after reading the next item in the view in item units.

According to the above described embodiment, the information in the table storing the actual data of the items output from the listing can be obtained by generating the report item definition table 22 in which the design information about items such as an item ID, item name, level, data type, number of digits, etc. of an item in the listing is defined. As a result, a model of a batch program for extracting actual data of the listing can be automatically generated according to the information.

Figure 10:
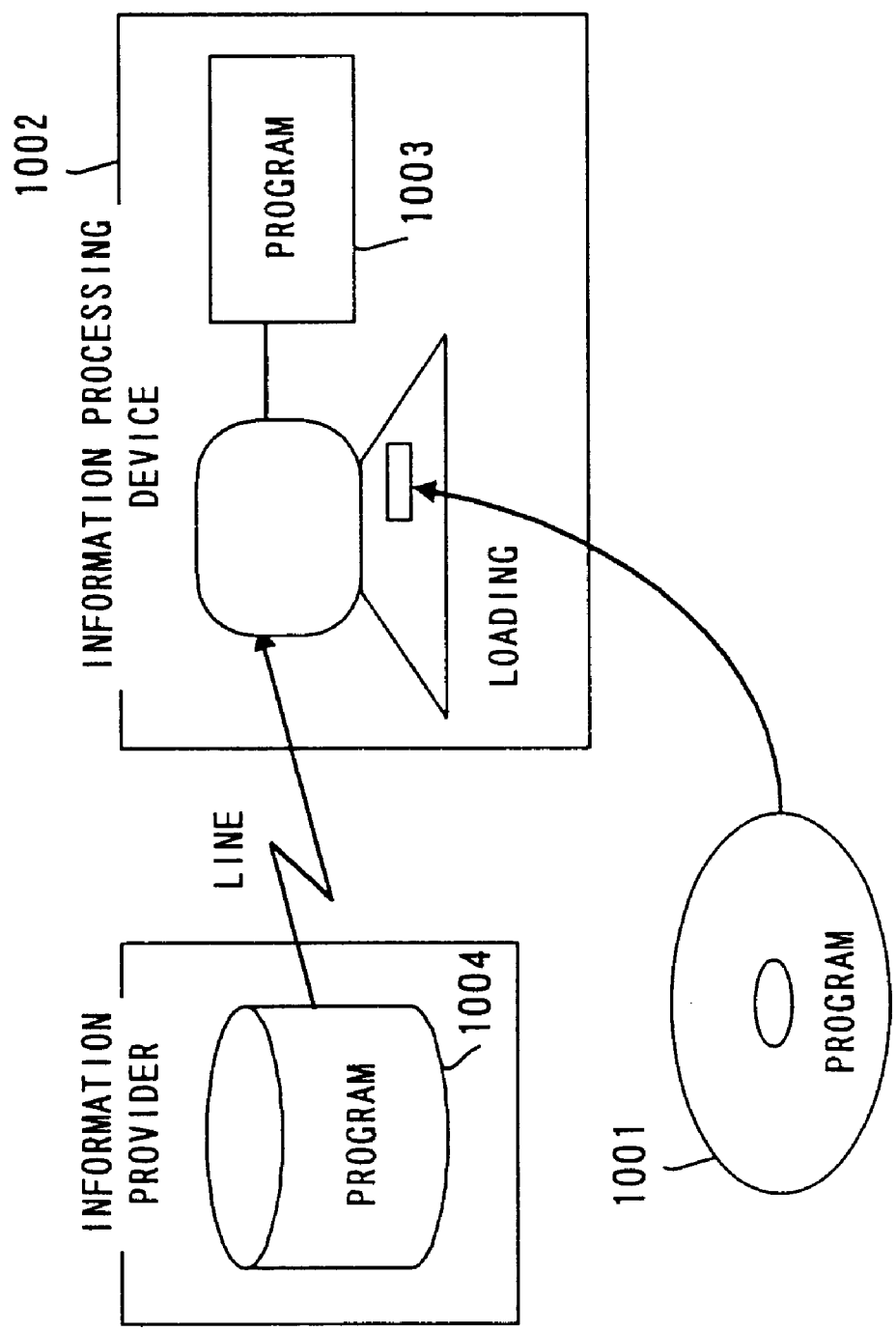
FIG. 10 shows a storage medium.

Furthermore, a program for generating a listing program according to the present invention can be stored in a storage medium 1001 such as a floppy disk, CDROM, etc. as shown in FIG. 10. The storage medium 1001 is read by a medium drive device 1002 (a floppy disk driver, a CDROM driver, etc.), and the read program is stored in a storage device 1003 such as a hard disk, etc. to execute the program. Otherwise, a program is stored in a storage device 1004 such as a hard disk, etc. of a computer of an information provider, transferred to the medium drive device 1002 of the use through a communications system, and then stored in the storage device 1003 of the user so that the program can be executed. In addition, a program stored in the storage medium 1001 can have a part of the function shown in the flowchart according to the above described embodiment.

The listing item information for use in generating test data is not limited to the report item definition table 22, the report detail link definition table 23, etc. according to the above described embodiment, but can be any of the information for use in verifying the output of a listing from the test data of each item.

According to the present invention, since test data for use in verifying an output result of a listing can be easily generated based on the test data of each item and listing item information, the load of generating test data for use in generating a listing program can be reduced. In addition, for example, by setting a number of occurrences of test data can be set for each item, test data in various patterns can be generated by combining the test data of a plurality of items. Therefore, the function such as feeding a page of a listing, aggregating data for each item, etc. can be easily verified. Furthermore, since test data consistent among a plurality of listings can be used, a plurality of related listings can be verified under the same conditions.

What is claimed is:

1. A method of generating test data of a listing program, by using a listing program generation apparatus that is equipped with a test data storage unit for storing previously generated test data, comprising:
    creating item IDs using the listing program generation apparatus, each item ID specifying an item contained in a listing and level information indicating to which of a card section and a detail section of the listing each of the item IDs belongs;
    storing the item IDs and the level information from the listing program generation apparatus as listing item information in an item information storage unit;
    creating link information to define links between card items belonging to the card section and detail items belonging to the detail section of the listing using the listing program generation apparatus;
    storing the link information from the listing program generation apparatus in a link information storage unit; and
    retrieving test data corresponding to the item IDs from the test data storage unit using the listing program generation apparatus with reference to both the item information storage unit and the link information storage unit.

2. The method according to claim 1,
    wherein the listing item information stored in the item information storage unit includes item IDs, the level information and a test data repeat number for each detail item,
    wherein said method further comprises:
        creating, using the listing program generation apparatus, detail test data for each detail item, repeated a number of times specified by the test data repeat number corresponding thereto, and
        generating the test data, using the listing program generation apparatus, for the listing program by combining the detail test data repeated the number of times specified by the test data repeat number corresponding to each of the detail item with card test data corresponding to the each of the card items.

3. The method according to claim 1, wherein the listing item information includes the item IDs, item names, the level information and the test data repeat numbers.

4. The method according to claim 1, further comprising:
    establishing, by the listing program generation apparatus, data spaces for the card items and the detail items in a work-data storage unit; and
    storing test data corresponding to the items associated with the data spaces into the work-data storage unit by retrieving from the test data storage unit, and stores the test data in the work data storage unit by retrieving from the test data storage unit.

5. A listing program generation apparatus equipped with a test data storage unit for storing previously generated test data, comprising:
    an item information storage unit to store item IDs each specifying an item contained in a listing and level information indicating to which of a card section and a detail section of the listing each of the item IDs belongs;
    a link information storage unit to store link information defining links between card items belonging to the card section and detail items belonging to the detail section of the listing; and
    a test data generation unit to generate test data for a listing program by retrieving stored test data corresponding to the item IDs from the test data storage unit with reference to both the item information storage unit and the link information storage unit.

6. The listing program generation apparatus according to claim 5, wherein the item information storage unit stores the item IDs, the level information, and test data repeat numbers for the detail items, and wherein said test data generation unit generates the test data by combining the detail test data repeated a number of times specified by the test data repeat numbers corresponding to the detail items with card test data corresponding to the card items.

7. The listing program generation apparatus according to claim 6, wherein said test data generation unit further generates the test data by establishing data spaces in a work-data storage unit for the detail items and the card items, and storing the test data corresponding to the items associated with the data spaces into the work-data storage unit by retrieving from said test data storage unit.

8. A computer-readable storage medium storing a program for controlling a listing program generation apparatus, equipped with a test data storage unit for storing previously generated test data, to perform a method comprising:

formulating item IDs specifying an item contained in a listing and level information indicating to which of a card section and a detail section of the listing each item ID belongs;

storing the item IDs and level information in an item information storage unit;

formulating link information defining links between card items belonging to the card section and detail items belonging to the detail section of the listing;

storing the link information in a link information storage unit; and generating test data for the listing program by retrieving stored test data corresponding to the item IDs from the test data storage unit with reference to both the item information storage unit and the link information storage unit.

9. The computer-readable storage medium according to claim 8, further comprising:

storing test data repeat numbers associated with the detail items in the item information storage unit; and generating the test data by combining card test data corresponding to the each of the card items with the detail test data, repeated a number of times specified by test data repeat numbers stored in the item information storage unit and corresponding to the detail items.

10. The computer-readable storage medium according to claim 8, wherein said storing the item IDs and the level information in the item informaation storage unit includes storing information based on the item IDs, item names, the level information the card items from the detail items, and test data repeat numbers in the item information storage unit.

* * * * *